United States Patent
Lockard

(10) Patent No.: US 6,768,050 B2
(45) Date of Patent: Jul. 27, 2004

(54) CONDUIT CONNECTOR APPARATUS

(75) Inventor: Walter G. Lockard, Hudson, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 2 days.

(21) Appl. No.: 10/077,456

(22) Filed: Feb. 15, 2002

(65) Prior Publication Data

US 2003/0155148 A1 Aug. 21, 2003

Related U.S. Application Data

(60) Provisional application No. 60/269,745, filed on Feb. 17, 2001.

(51) Int. Cl.$^7$ .................................................. H01B 7/00
(52) U.S. Cl. ..................... 174/28; 174/113 C; 174/115; 174/15.6
(58) Field of Search ............................... 174/68.1, 72 A, 174/99 R, 101, 48, 135; 52/220.7, 220.1; 138/106, 161, 162, 166, 168

(56) References Cited

U.S. PATENT DOCUMENTS

| | | | |
|---|---|---|---|
| 3,909,505 A | 9/1975 | Taylor | 174/72 A |
| 4,156,795 A | 5/1979 | Lacan | 174/97 |
| 4,166,195 A | 8/1979 | Schwab | 174/95 |
| 4,466,641 A * | 8/1984 | Heilman et al. | 285/406 |
| 4,589,449 A | 5/1986 | Bramwell | 138/162 |
| 4,602,124 A | 7/1986 | Santucci | 174/101 |
| 4,627,469 A | 12/1986 | Buard | 138/92 |
| 4,875,871 A | 10/1989 | Booty, Sr. et al. | 439/209 |
| 4,990,722 A | 2/1991 | Benito Navazo | 174/97 |
| 5,235,136 A | 8/1993 | Santucci et al. | 174/68.3 |
| 5,359,143 A | 10/1994 | Simon | 174/101 |
| 5,448,012 A | 9/1995 | Jacob | 174/48 |
| 5,685,113 A | 11/1997 | Reuter et al. | 52/220.7 |
| 5,709,249 A | 1/1998 | Okada et al. | 138/162 |
| 5,728,976 A | 3/1998 | Santucci et al. | 174/135 |
| 5,753,855 A | 5/1998 | Nicoli et al. | 174/49 |
| 5,792,993 A | 8/1998 | Rinderer | 174/101 |
| 5,867,313 A * | 2/1999 | Schweitzer et al. | 359/418 |
| 6,211,460 B1 | 4/2001 | Hull et al. | 174/48 |
| 6,412,519 B1 * | 7/2002 | Goodhue | 138/109 |

OTHER PUBLICATIONS

Undated prior art Carlon catalog page entitled "Carlon Wire Safe Wireway Fittings."

* cited by examiner

Primary Examiner—Dean A. Reichard
Assistant Examiner—Jinhee Lee
(74) Attorney, Agent, or Firm—Jones Day

(57) ABSTRACT

An apparatus connects a pair of open-ended electrical conduits together end-to-end. Each conduit has a channel portion with an open side and a cover portion for closing the open side of the channel portion. The apparatus includes a channel-shaped connector structure having an open side. The connector structure is receivable in an installed position engaging the open ends of the conduits, with the open side of the connector structure aligned with the open sides of the conduits. A fastener structure is mounted on the connector structure for movement with the connector structure relative to the conduits upon movement of the connector structure toward and into its installed position, and to restrain removal of the connector structure from its installed position.

55 Claims, 10 Drawing Sheets

CONDUIT CONNECTOR APPARATUS

This patent application claims priority to the provisional patent application filed Feb. 17, 2001, Serial No. 60/269,745.

FIELD OF THE INVENTION

The present invention relates to conduits for containing electrical wiring.

BACKGROUND OF THE INVENTION

A conduit for containing electrical wiring may be configured as a channel with an open side through which the wiring can be laid into the conduit. A cover portion of the conduit is releaseably installed over the open side of the channel to close the open side.

Such conduits are joined together end-to-end by relatively short, channel-shaped connectors. One type of channel-shaped connector fits within the adjacent ends of two conduits. The connector is fixed in place by an adhesive that is applied to the outer side surfaces of the connector before it is inserted in the conduits. Another type of channel-shaped connector fits on the outside of the two conduits. That type of connector is fixed in place by "Christmas tree" fasteners that are inserted through aligned openings in the connector and the conduits.

SUMMARY OF THE INVENTION

The present invention is an apparatus for use with a pair of open-ended conduits for containing electrical wiring. Each conduit has a channel portion with an open side, and further has a cover portion for closing the open side of the channel portion.

In accordance with a distinct feature of the invention, the apparatus includes a channel-shaped connector structure, and further includes a fastener structure which is mounted on the connector structure. The connector structure is receivable in an installed position engaging the open ends of the conduits, with an open side of the connector structure aligned with the open sides of the conduits. The fastener structure is mounted on the connector structure for movement with the connector structure relative to the conduits upon movement of the connector structure toward and into its installed position, and to restrain removal of the connector structure from its installed position.

In accordance with another distinct feature of the invention, the connector structure has an abutment portion with a pair of opposite side surfaces. The opposite side surfaces of the abutment portion are configured to abut the opposed end surfaces of the conduits when the connector structure is in its installed position. The opposite side surfaces are preferably defined by a pair of gaskets, and preferably have adhesive coatings that are initially covered by peelable paper strips.

Another distinct feature of the invention is a lid that is receivable in an installed position extending over the open side of the installed connector structure. Preferably, the lid overlaps the covers on the conduits, and a gasket is interposed between the lid and the covers on the conduits.

Yet another distinct feature of the invention is a tether that extends from the channel portion of a conduit to a respective cover portion to retain the cover portion with the channel portion.

DESCRIPTION

Figure 1:
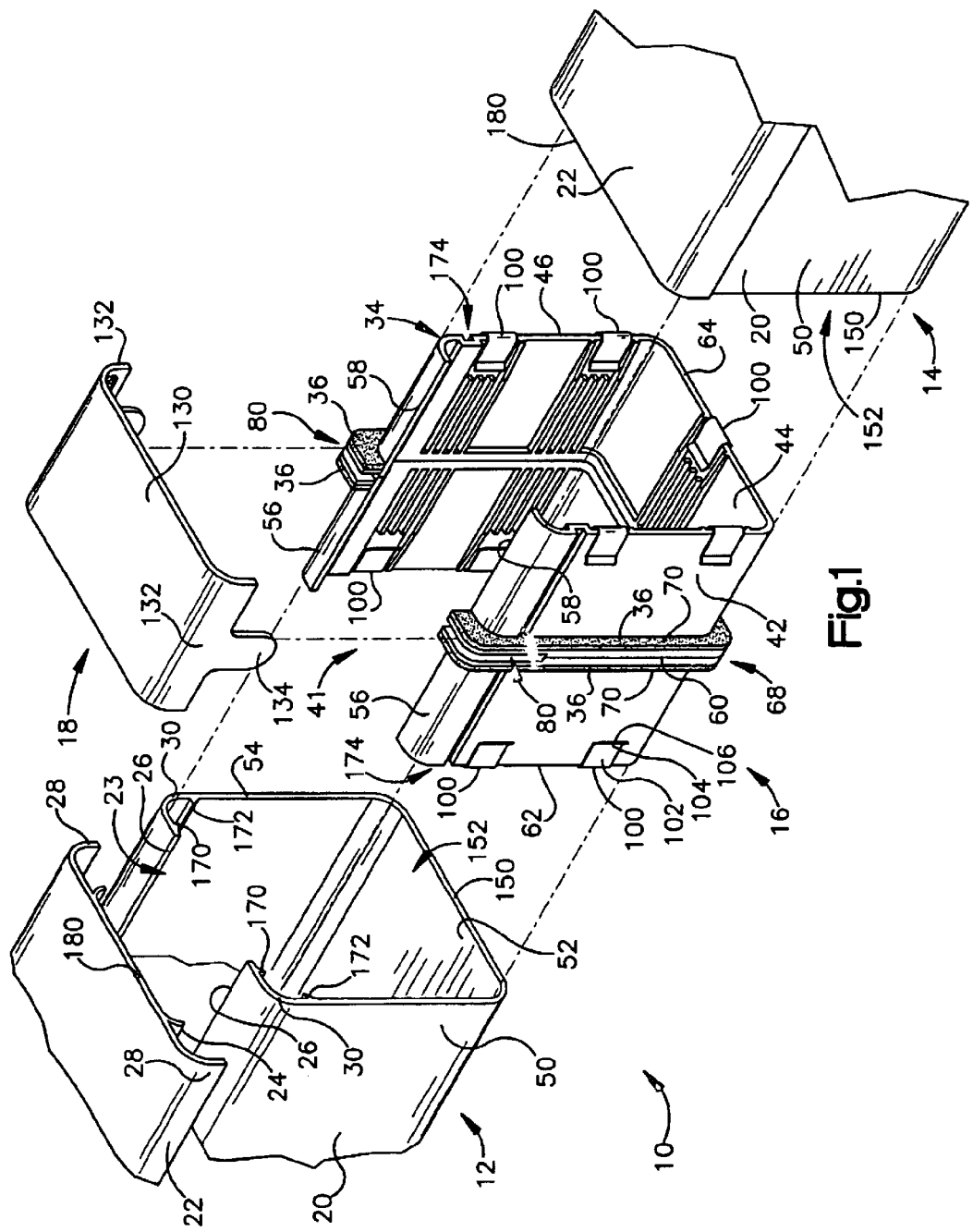
FIG. 1 is an exploded view of parts of an apparatus comprising an embodiment of the claimed invention.

The apparatus 10 shown in FIG. 1 has parts which, as described below, are examples of the elements recited in the claims.

The apparatus 10 includes a pair of conduits 12 and 14 for containing electrical wiring. In accordance with the invention, a connector 16 and a lid 18 cooperate with the conduits 12 and 14 to join and seal them together end-to-end.

The conduits 12 and 14 themselves are known in the art. Each includes a channel 20 and a cover 22. An open side 23 of the channel 20 is wide enough for bundles of electrical wiring or cables to be laid into the channel 20. When the cover 22 is placed over the channel 20 to close the open side 23, a pair of ribs 24 at the inner side of the cover 22 snap into engagement with opposed inner edge surfaces 26 that extend along the open side 23 of channel 20. Corner portions 28 of the cover 22 then reach around adjacent corners 30 of the channel 20 such that the cover 22 closes the open side 23 of the channel 20. These parts 20 and 22 are preferably formed of polyvinyl chloride (PVC), and are thin enough to flex sufficiently for the cover 22 to be installed and removed manually by a technician in the field.

As shown in FIG. 1, the connector 16 includes a plastic part 34 and a pair of gaskets 36. The plastic part 34 of the connector 16, which is shown separately in FIGS. 2–7, is a one-piece molded PVC part which may be somewhat less flexible than the conduits 12 and 14. Like the channels 20 at the conduits 12 and 14, the plastic part 34 of the connector 16 is channel-shaped. It thus has an open side 41 and three closed side walls 42, 44 and 46 parallel to the three closed side walls 50, 52 and 54 of the channels 20. The open side 41 of the plastic part 16 is defined by a pair of corner portions 56 with inner edge surfaces 58 that face each other across the open side 41.

Figure 2:
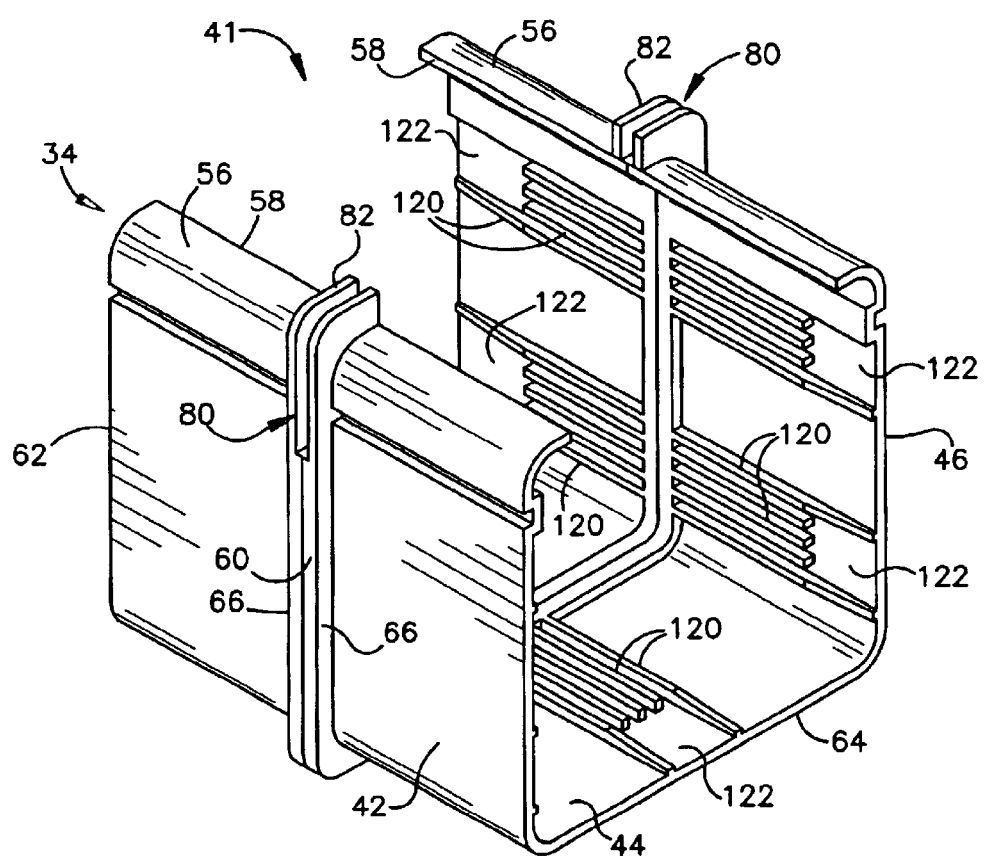
FIG. 2 is a perspective view of a part shown in FIG. 1.
Figure 3:
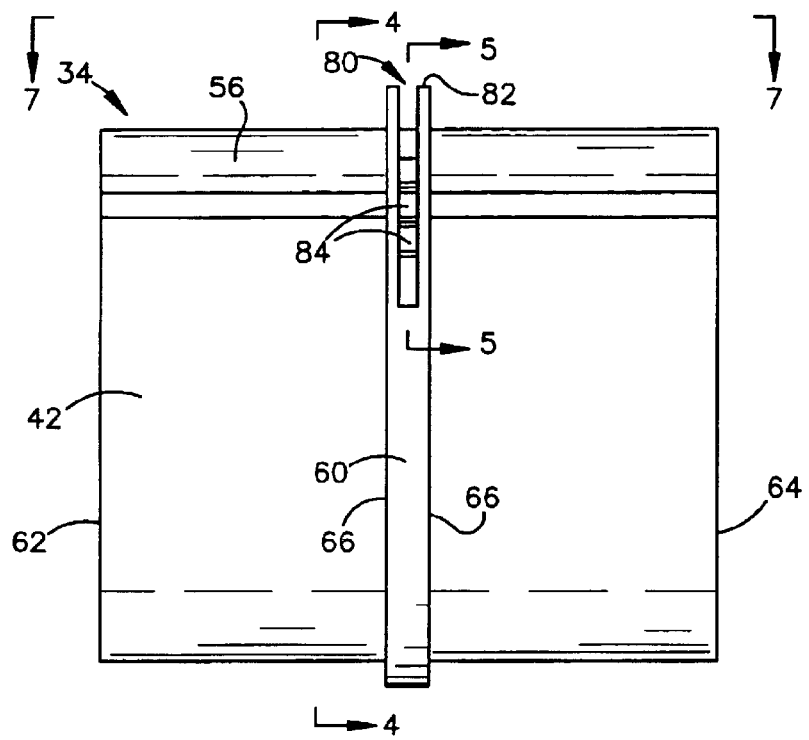
FIG. 3 is a side view of the part shown in FIG. 2.
Figure 4:
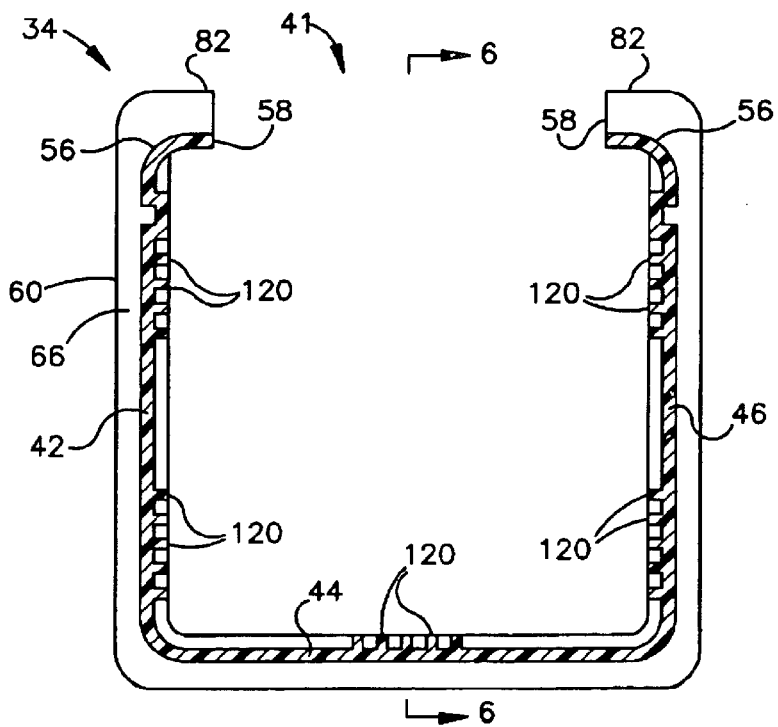
FIG. 4 is a view taken on line 4—4 of FIG. 3.
Figure 8:
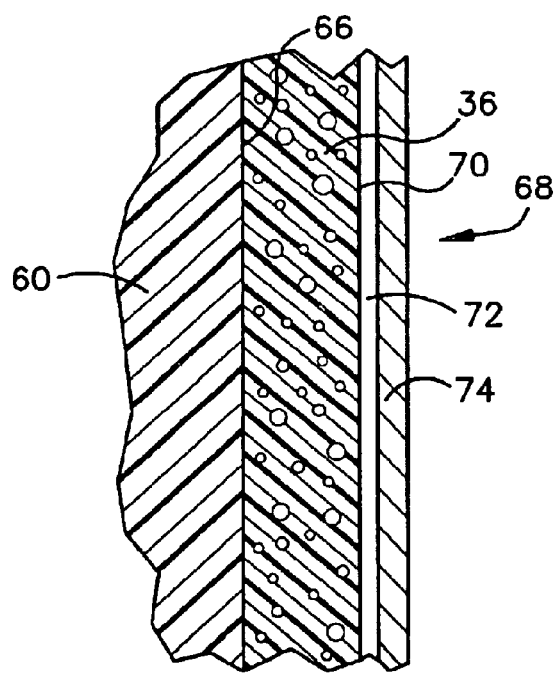
FIG. 8 is an enlarged sectional view of parts shown in FIG. 1.

As best shown in FIGS. 2 and 3, a flange portion 60 of the plastic part 34 is located midway between its opposite ends 62 and 64. The flange 60 is configured as a collar that extends fully about the outer periphery of the three side walls 42, 44 and 46 of the plastic part 34, and likewise terminates at the edge surfaces 58 that face each other across the open side 41. The gaskets 36 (FIG. 1) are strips that contiguously overlie, and are adhesively bonded to, the opposite side surfaces 66 of the flange 60. In this arrangement, the flange 60 and the gaskets 36 together define an external abutment portion 68 of the connector 16. The abutment portion 68 has parallel opposite side surfaces 70 that face in opposite directions along the length of the connector 16. Each of these surfaces 70 has an adhesive coating 72 which, as shown in FIG. 8, is initially protected by a peel-away paper strip 74.

Figure 5:
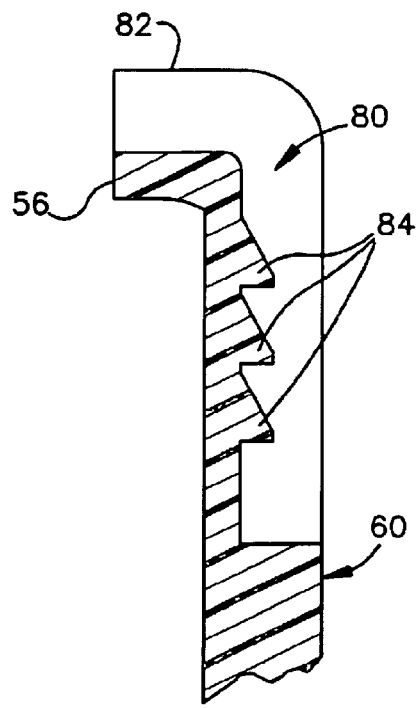
FIG. 5 is a view taken on line 5—5 of FIG. 3.

The flange 60 has slots 80. As best shown in FIGS. 3 and 5, each slot 80 is open at the respective upper end 82 of the flange 60, and extends downward along the length of the flange 60. A plurality of ratchet teeth 84 are arranged in a row in each slot 80.

As further shown in FIG. 1, a plurality of metal fastener clips 100 are mounted on the plastic part 34 of the connector 16. Each fastener clip 100 is a U-shaped part with a pair of arms 102 that converge toward a pair of free end portions 104. The free end portions 104 are flared outwardly of the arms 102, and each has a free terminal edge 106.

The clips 100 are mounted on the side walls 42, 44 and 46 of the plastic part 34, as shown in FIG. 1, by pushing them against the ends 62 and 64 of the plastic part 34 so as to force the arms 102 to spread apart as the clips 100 slide into place. The clips 100 are thus mounted on the side walls 42, 44 and 46 of the plastic part 34 in stressed conditions in which the arms 102 exert a spring force clamping themselves in place.

Figure 6:
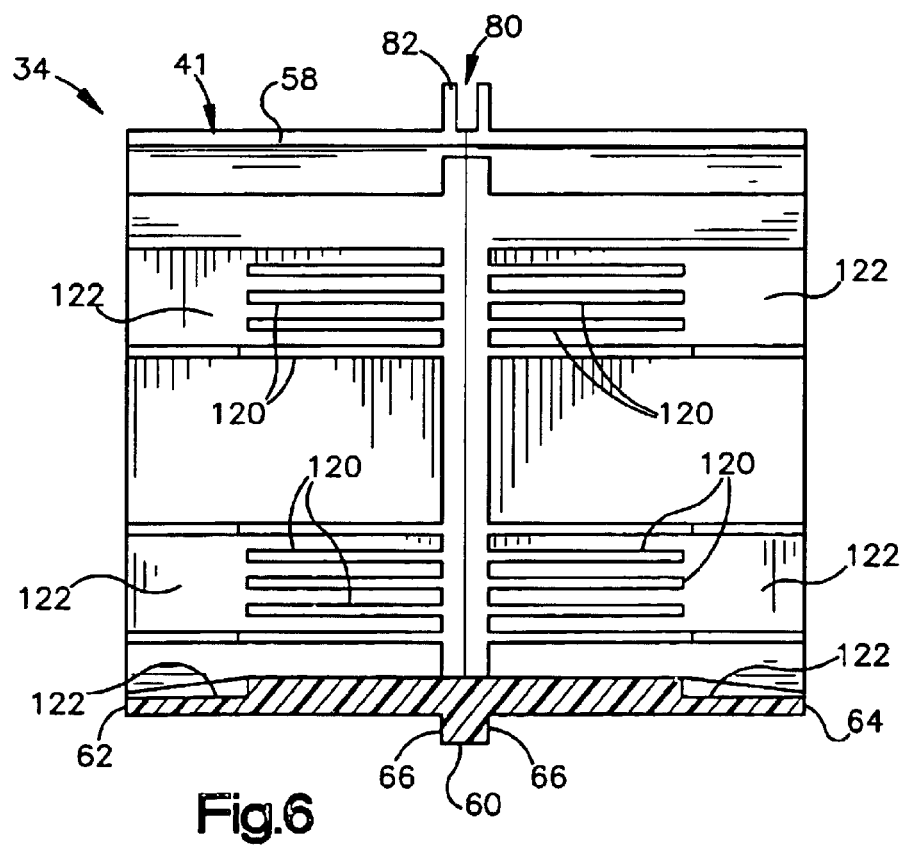
FIG. 6 is a view taken on line 6—6 of FIG. 4.
Figure 7:
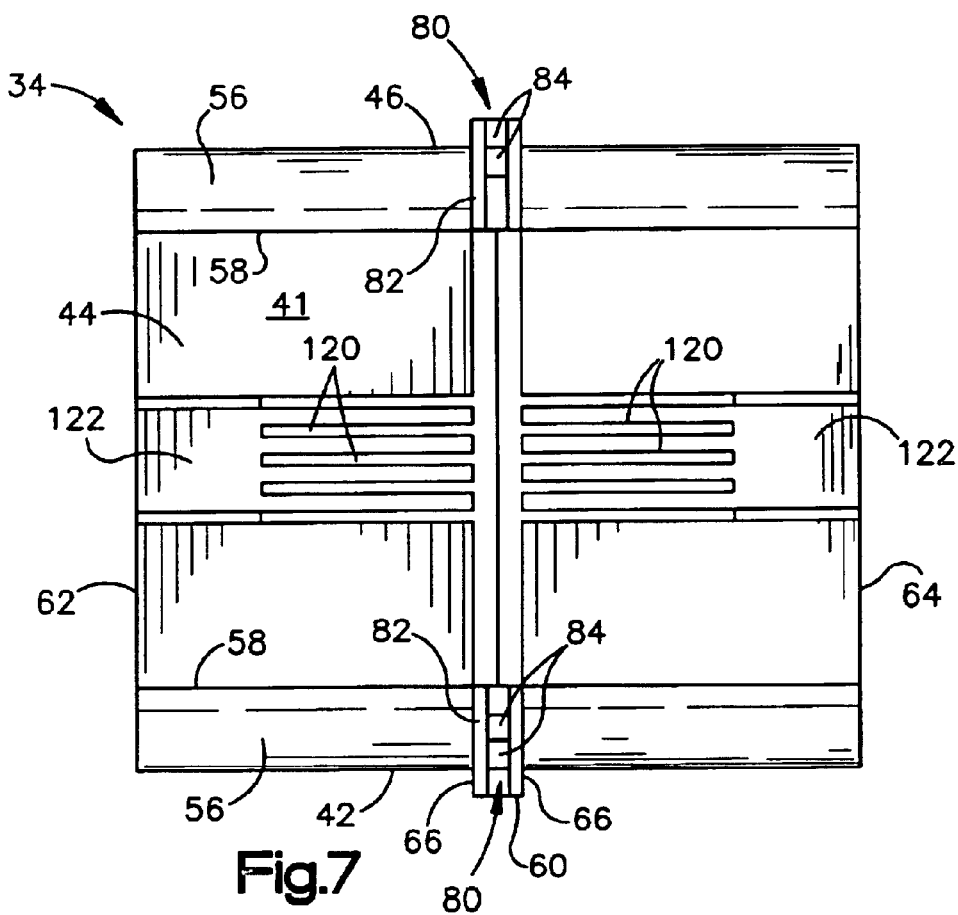
FIG. 7 is a view taken on line 7—7 of FIG. 3.

The plastic part 34 of the connector 16 further has several arrays of internal ribs 120. As best shown in FIGS. 2, 6 and 7, each array of ribs defines a mounting location 122 for receiving an arm 102 of a corresponding fastener clip 100. As described above, the free end portions 104 of the clips 100 are flared outwardly of the arms 102. Accordingly, the free end portions 104 that are located at the exterior of the plastic part 36 project outward from the side walls 42, 44 and 46, and the free end portions 104 that are located at the interior of the plastic part 36 project inward from the side walls 42, 44 and 46. Therefore, the ribs 120 project inward from the side walls 42, 44 and 46 farther than the free end portions 104 of the clips 100 so as to block electrical cables or wires from contacting the end edges 106 of the clips 100 within the connector 16.

Figure 9:
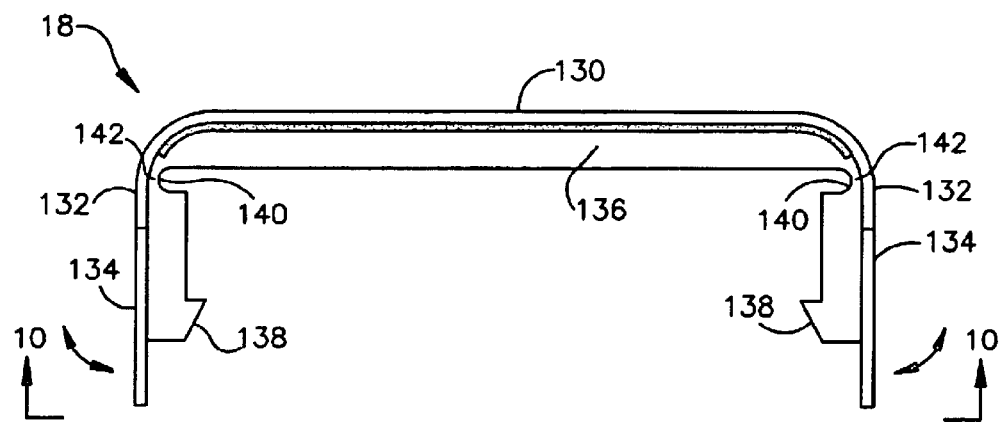
FIG. 9 is an end view of a part shown in FIG. 1.
Figure 10:
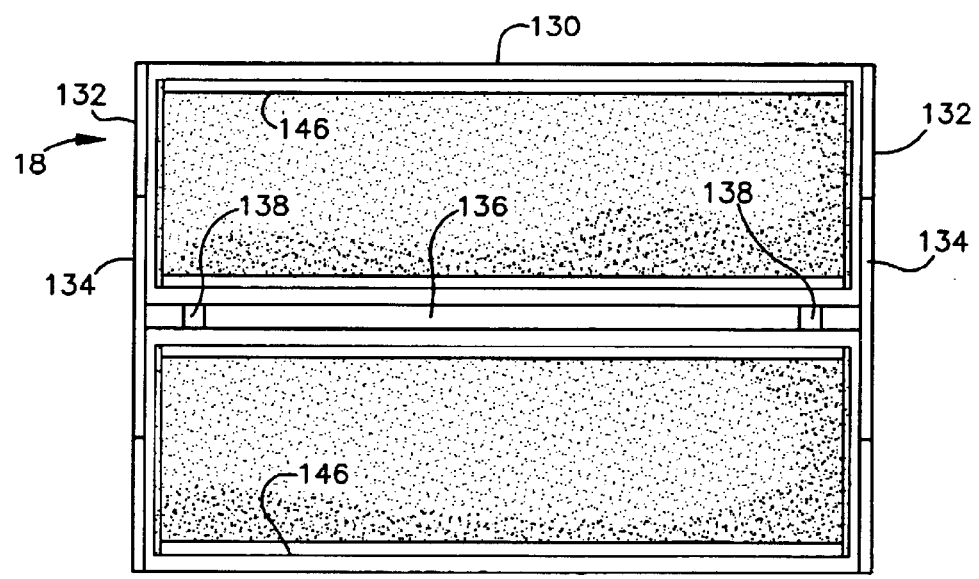
FIG. 10 is a view taken on line 10—10 of FIG. 9.

The lid 18, which also is formed of PVC, has a rectangular top 130 and a pair of corner portions 132 that project downward from the top 130. The lid 18 further has a pair of locking tabs 134 that project downward from the corner portions 132. A rib 136 (FIG. 9) at the underside of the lid 18 defines a pair of ratchet teeth 138 on the locking tabs 134. As indicated by the arrows shown in FIG. 9, the locking tabs 134 on the lid 18 are flexible relative to the top and corner portions 130 and 132. A pair of narrow, flexible hinge portions 142 of the rib 136 adjoin the corners 132 for this purpose. As best shown in FIG. 10, gasket strips 146 are adhered to the underside of the lid 18 in rectangular arrays on opposite sites of the rib 136.

Figure 11:
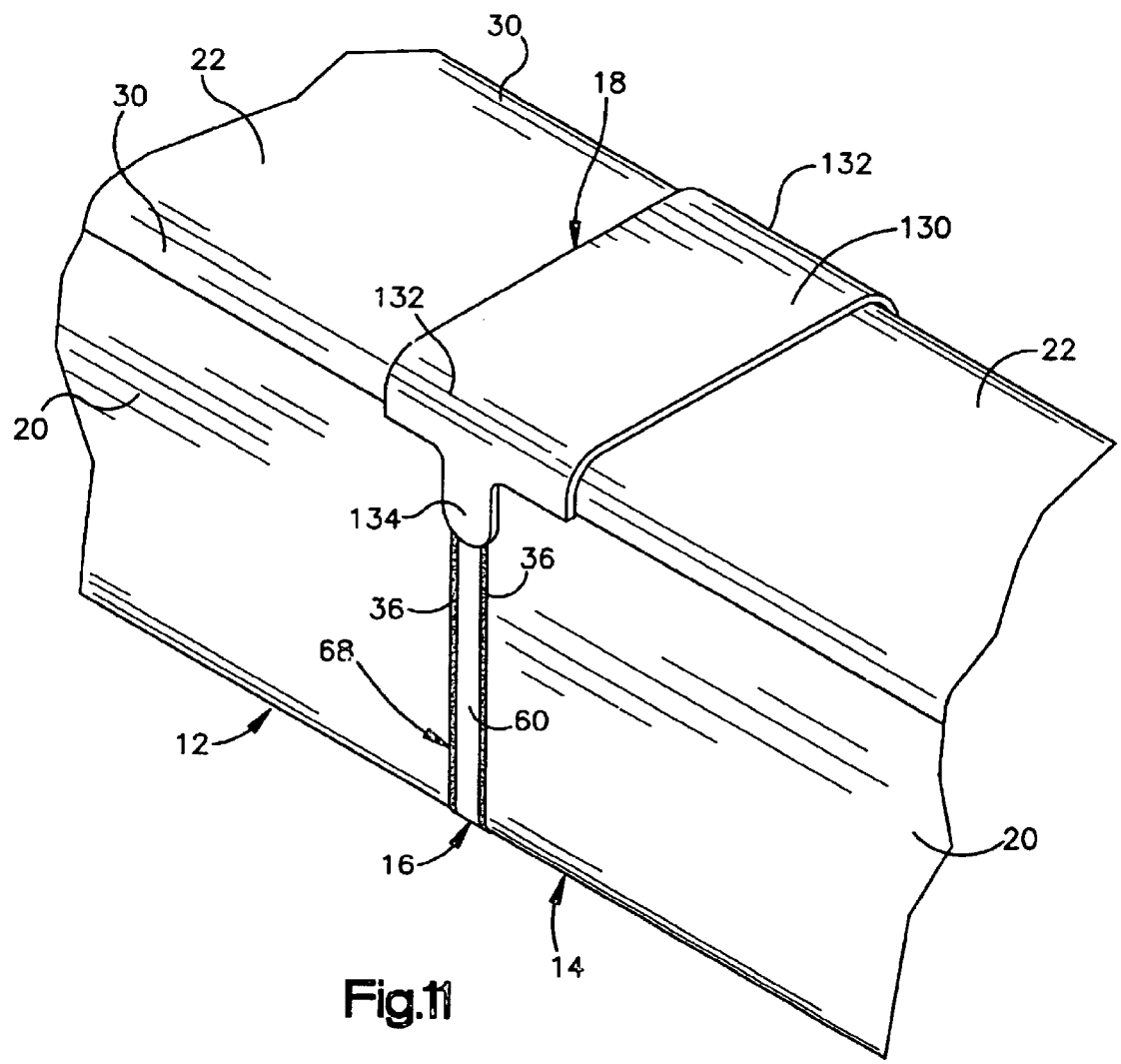
FIG. 11 is a view showing the parts of FIG. 1 in an interconnected relationship.

The parts 12–18 shown in FIG. 1 can be interconnected in the closed and sealed configuration in which they are shown in FIG. 11. This is accomplished by sliding the connector 16 into the channel portions 20 of the conduits 12 and 14 until the surfaces 70 of the gaskets 36 move into abutting contact with the edge surfaces 150 at the open ends 152 of the channels 20. The plastic part 34 of the connector 16 is sized to fit closely within the channels 20. This causes the fastener clips 100 to fit tightly between the exterior of the plastic part 34 and the interiors of the channels 20. When the connector 16 is being moved inward through the open end 152 of a channel 20, the clips 100 move with the connector 16 such that the terminal end edges 106 at the exterior of the connector 16 are trailing edges that slide along the inner side wall surfaces of the channel 20. Such sliding contact of the trailing edges 106 does not significantly restrain movement of the connector 16 inward of the channel 20. However, the free end portions 104 of the clips 100 are oriented such that the edges 106 will tend to dig into the adjacent side wall surfaces of the channel 20, and thereby to restrain removal of the connector 16 from the channel 20, if the connector 16 is pulled back outward. Accordingly, when the connector 16 has been moved fully into the channel portions 20 of the two conduits 12 and 14 in the foregoing manner, the fastener clips 100 restrain removal of the connector 16 from the conduits 12 and 14 sufficiently to fasten the two conduits 12 and 14 together. The gaskets 36, which are then engaged compressively between the flange 60 and the opposed end surfaces 150 of the two channels 20, provide water resistant seals between the channels 20. The adhesive coatings 72 on the opposite side surfaces 70 of the gaskets 36 bond the gaskets 36 to the channels 20 to enhance the sealing effect.

As further indicated in FIG. 1, the corners 56 at the open side of the connector 16 are configured to mate with the corners 30 at the open sides 23 of the channels 20. Each corner 30 of a channel 20 has a pair of internal ribs 170 and 172. The ribs 170 and 172 are spaced apart from each other diagonally across the inside of the corner 30. When the connector 16 is moved into a channel 20, the edge surfaces 58 at the corners 56 of the connector 16 slide against the upper ribs 170 at the corners 30 of the channel 20. The lower ribs 172 in the channel 20 are simultaneously received in grooves 174 that extend along the corners 56 of the connector 16. The corners 56 of the connector 16 are thus guided into the channel 20 by the ribs 170 and 172, and are also engaged tightly by and between the ribs 170 and 172 to enhance the tight fit of the connector 16 in the channels 20.

The covers 22 on the conduits 12 and 14 can be installed over the channels 20 either before or after the connector 16 is installed in the channels 20. In either case, the end edges 180 of the covers 22 are moved into abutment with the opposite side surfaces 70 of the gaskets 36 at the upper corners 56 of the connector 16. The end edges 180 of the covers 22 are then spaced apart from each other across a gap. Specifically, the gap between the end edges 180 is as wide as the abutment portion 68 of the connector 16 between the opposite side surfaces 70 of the gaskets 36. The gap extends lengthwise across the open side 41 of the connector 16 between the upper ends of the abutment portion 68. The lid 18 is then installed over the connector 16 and the conduits 12 and 14 by moving the ratchet teeth 138 on the lid 18 downward into engagement with the ratchet teeth 84 in the slots 80 on the flange 60. The rib 136 on the lid 18 is then received in the gap between the opposed end edges 180 of the covers 22, and extends into the upper ends of the slots 80 at opposite ends of the gap. The gasket strips 146 that extend alongside the rib 136, as shown in FIG. 10, also are received in the gap between the end edges 180 of the covers 22. These gasket strips 146 are compressed between the rib 136 and the edges 180 to complete a gasket seal that extends fully around all four sides 41, 42, 44 and 46 of the installed connector 16. When the ratchet teeth 138 on the lid 18 are moved downward into engagement with the lower-most ratchet teeth 84 in the slots 80, all of the gasket strips 146 at the underside of the lid 18 are compressively engaged between the lid 18 and the covers 22 for additional sealing.

Figure 12:
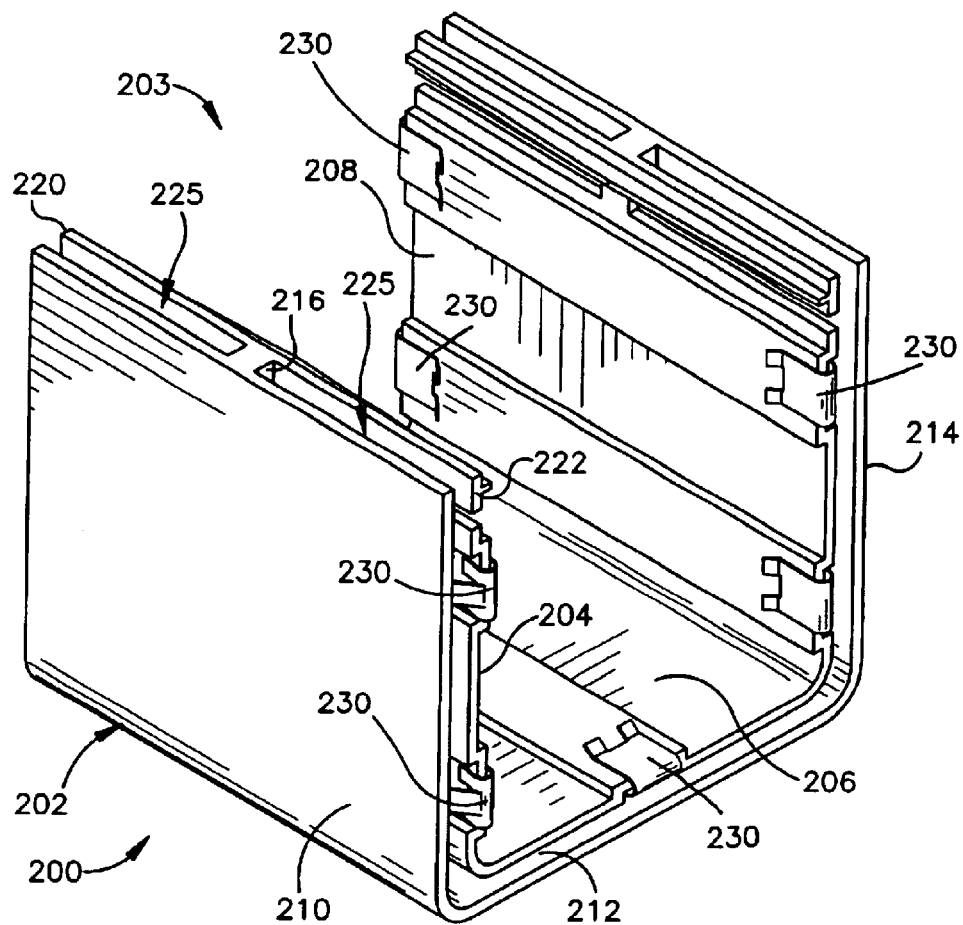
FIG. 12 is a view similar to FIG. 2, showing alternative parts.

Another example of a channel-shaped connector that can be used in accordance with the invention is shown in FIG. 12. This connector 200 includes a one piece molded PVC part 202 having an open side 203; three inner side walls 204, 206 and 208; and three outer side walls 210, 212 and 214.

The inner side walls 204–208 are spaced from the outer side walls 210–214 by a rib 216 that is located midway between the opposite ends 220 and 222 of the plastic part 202. The plastic part 202 thus defines a pair of channel-shaped compartments 225 that are open at the opposite ends 220 and 222 for receiving the opposed open end portions of the channels 20 shown in FIG. 1. The inner side walls 204–208 of the connector 200 then extend into the conduits 12 and 14, and preferably extend fully inward into abutment with the rib 216. Fastener clips 230 on the inner side walls 204–208 fasten the conduits 12 and 14 together with the connector 200 in the same manner as the fastener clips 100 described above.

Figure 13:
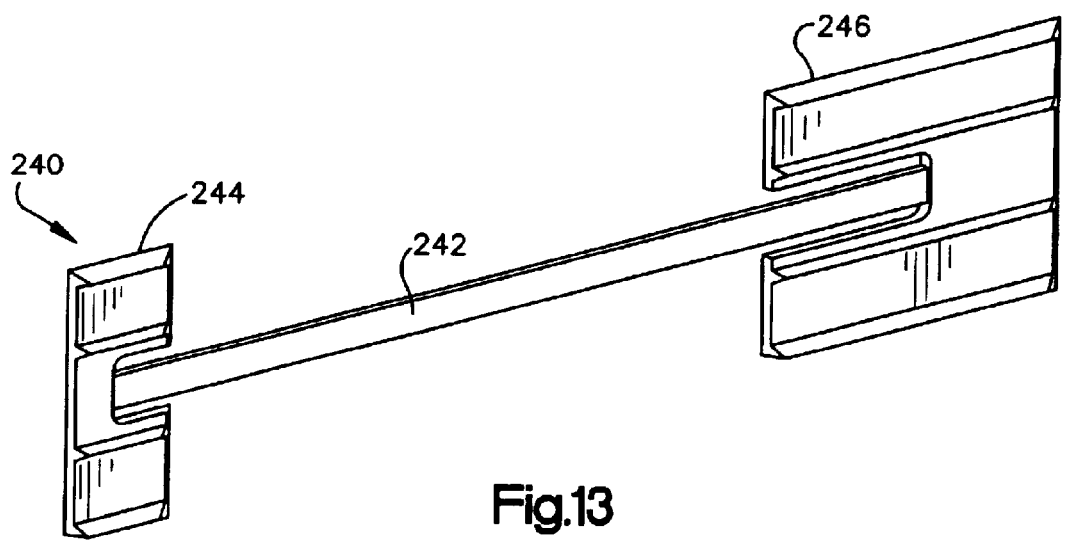
FIG. 13 is a perspective view of an additional part of the apparatus.

An additional part 240 of the apparatus 10 is shown in FIG. 13. This part 240 is a tether for retaining a conduit cover 22 with the respective conduit channel 20. The tether 240 is a one piece molded plastic part with a strap portion 242 interconnecting first and second opposite end portions 244 and 246.

Figure 14:
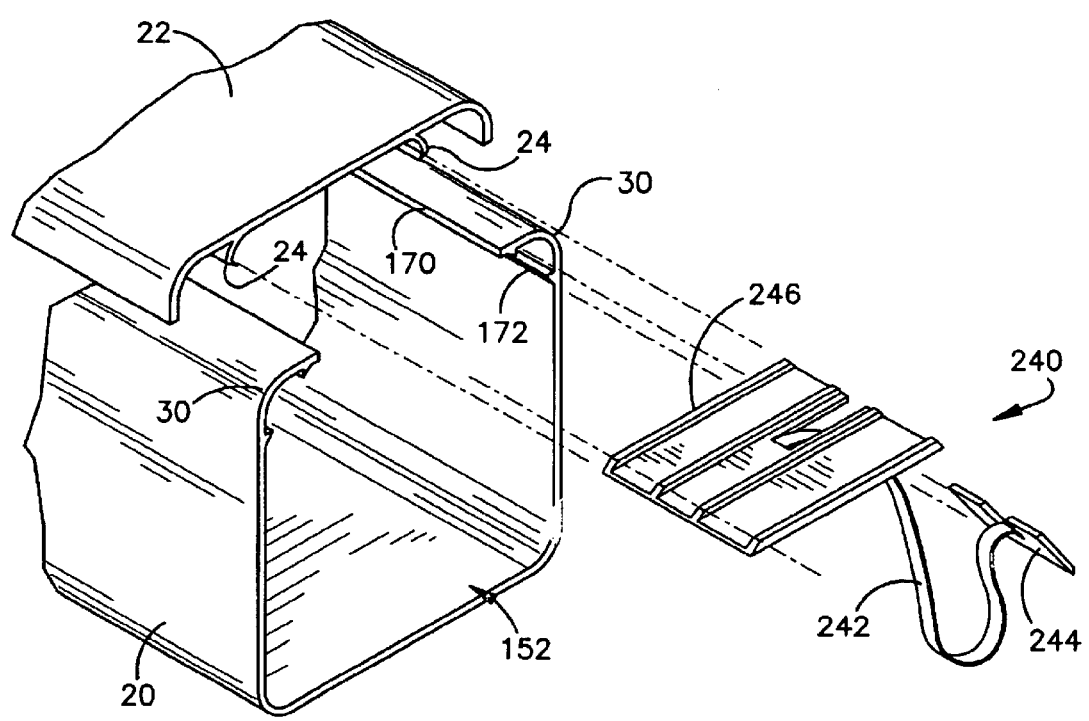
FIGS. 14 and 15 are perspective views showing the part of FIG. 13 in use with other parts of the apparatus.
Figure 15:
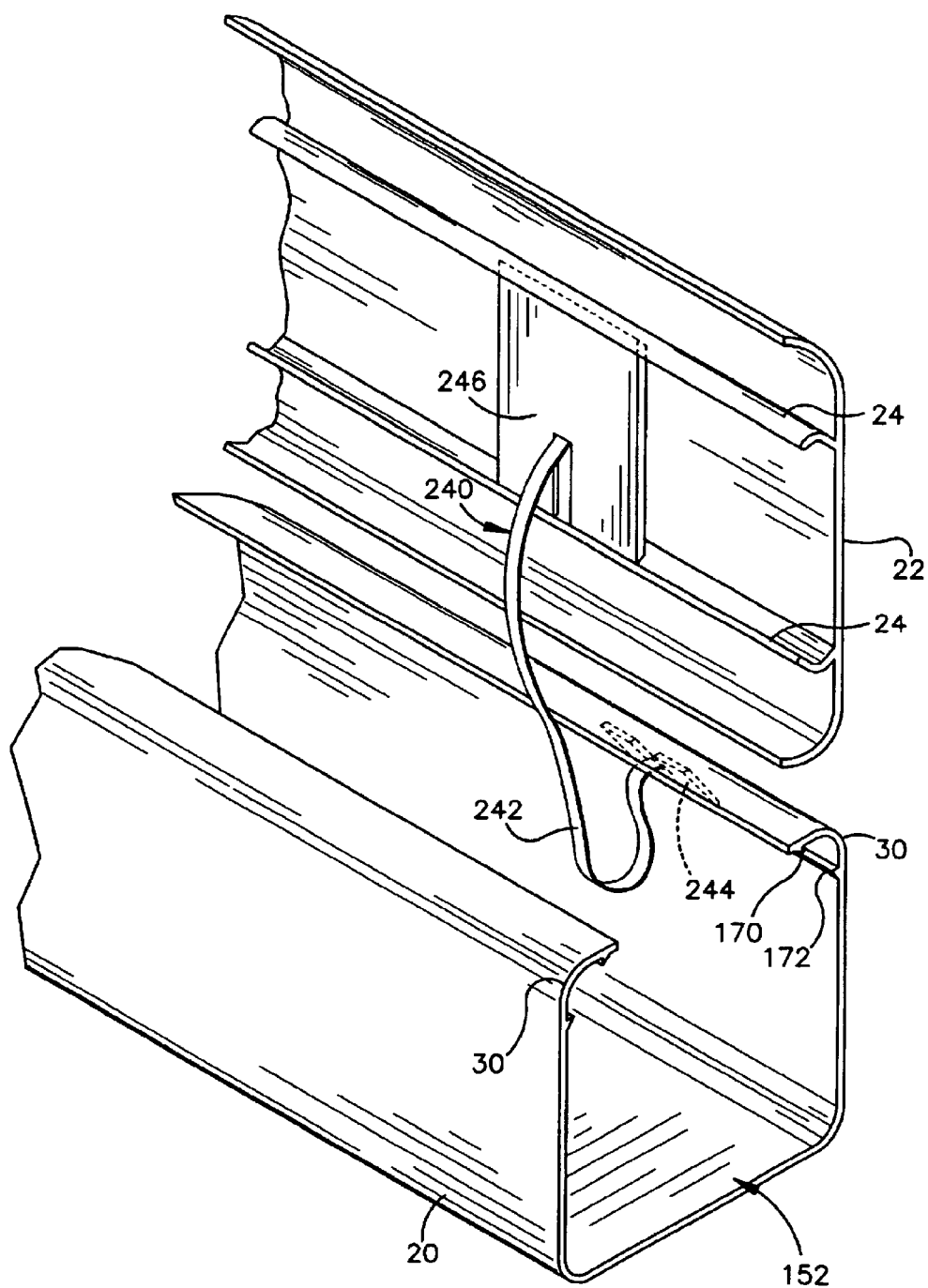

As indicated in FIGS. 14 and 15, the first end portion 244 of the tether 240 is configured to fit within the corner 30 of a channel 20 between the ribs 170 and 172 at the inside of the corner 30. The first end portion 244 of the tether 240 can be snapped into place between the ribs 170 and 172 from within the channel 20, but is preferably inserted between the ribs 170 and 172 by sliding it inward through the open end 152 of the channel 20, i.e., in a direction from right to left as viewed in FIG. 14. When the first end portion 244 is in place between the ribs 170 and 172, it extends diagonally across the inside of the corner 30 between the ribs 170 and 172, and is slideable along the length of the channel 20 in a track that is effectively defined by the ribs 170 and 172. The second end portion 246 of the tether 240 is receivable between the ribs 24 at the underside of the cover 22 in the same manner. The installed tether 240 is thus engaged with both the channel 20 and the cover 22 to help prevent the cover 22 from being dropped out of reach when the electrical wiring is being layed into the channel 20 through the open side 23, or when the connector 16 and lid 18 are being installed between the conduits 12 and 14.

This written description uses examples to disclose the invention, including the best mode, and also to enable any persons skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use with a pair of open-ended conduits for containing electrical wiring, each of which has a channel portion with an open side and a cover portion for closing the open side of the channel portion, said apparatus comprising:
   a channel-shaped connector structure having an open side, said connector structure being receivable in an installed position engaging the open ends of the conduits with said open side of said connector structure aligned with the open sides of the conduits; and
   a fastener structure mounted on said connector structure for movement with said connector structure relative to the conduits upon movement of said connector structure toward and into said installed position, and to restrain removal of said connector structure from said installed position.

2. An apparatus as defined in claim 1 wherein said connector structure extends into the open ends of the conduits when in said installed position.

3. An apparatus as defined in claim 1 wherein said fastener structure comprises a tab having a trailing edge configured to slide along an inner surface of a corresponding conduit upon movement of said connector structure inward of the conduit, and to engage the surface of the conduit to restrain movement of said connector structure back outward of the conduit.

4. An apparatus as defined in claim 3 wherein said tab is formed of metal and said conduits and said channel-shaped connector structure are of plastic material.

5. An apparatus as defined in claim 4 wherein said tab is defined by a U-shaped metal clip received over a terminal end portion of said connector structure.

6. An apparatus as defined in claim 3 wherein said tab is one of a pair of oppositely oriented tabs at respective opposite end portions of said connector structure.

7. An apparatus as defined in claim 6 wherein each of said pair of tabs is one of a plurality of tabs that are located at the same end portion of said connector structure.

8. An apparatus as defined in claim 1 wherein said connector structure has opposite ends and an abutment portion located intermediate said opposite ends, said abutment portion having a pair of opposite side surfaces configured to abut opposed end surfaces of the two conduits when said connector structure is in said installed position.

9. An apparatus as defined in claim 8 wherein said abutment portion of said connector structure is shaped as a collar extending about the periphery of said connector structure.

10. An apparatus as defined in claim 8 wherein said abutment portion of said connector structure includes a rigid body and a pair of gaskets defining said opposite side surfaces on opposite sides of said rigid body.

11. An apparatus as defined in claim 10 wherein said gaskets are adhesively bonded to said rigid body, and have adhesive on said opposite side surfaces for bonding said connector structure to the opposed end surfaces of the two conduits.

12. An apparatus as defined in claim 11 further comprising a pair of peelable covers over said adhesive at said opposite side surfaces.

13. An apparatus as defined in claim 1 further comprising a lid receivable in an installed position in which said lid extends over said open side of said connector structure, said lid having a length longitudinally of said connector structure that is less than the longitudinal length of said connector structure.

14. An apparatus as defined in claim 13 wherein said connector structure and said lid are configured to interlock with each other in said installed positions.

15. An apparatus as defined in claim 13 wherein said lid is configured to overlap the cover portions of the conduits when said lid is in said installed position.

16. An apparatus as defined in claim 15 further comprising a gasket structure mounted on an underside of said lid so as to overlie the cover portions of the conduits when said lid is in said installed position.

17. An apparatus for use with a pair of open-ended conduits for containing electrical wiring, each of which has a channel portion with an open side and a cover portion for closing the open side of the channel portion, said apparatus comprising:
   a channel-shaped connector structure having an open side, said connector structure being receivable in an installed position engaging the open ends of the conduits with said open side of said connector structure aligned with the open sides of the conduits;

said connector structure having an abutment portion with a pair of opposite side surfaces configured to abut opposed end surfaces of the conduits when said connector structure is in said installed position.

18. An apparatus as defined in claim 17 wherein said connector structure extends into the open ends of the conduits when in said installed position.

19. An apparatus as defined in claim 17 wherein said opposite side surfaces are coated with adhesive for bonding said connector structure to the opposed end surfaces of the conduits.

20. An apparatus as defined in claim 19 further comprising a pair of peelable covers over said adhesive at said opposite side surfaces.

21. An apparatus as defined in claim 17 wherein said abutment portion of said connector structure is shaped as a collar extending about the periphery of said connector structure.

22. An apparatus as defined in claim 17 wherein said abutment portion of said connector structure includes a rigid body and a pair of gaskets defining said opposite side surfaces on opposite sides of said rigid body.

23. An apparatus as defined in claim 22 wherein said gaskets are adhesively bonded to said rigid body, and have adhesive on said opposite side surfaces for bonding said connector structure to the conduits.

24. An apparatus as defined in claim 17 wherein said opposite side surfaces are configured to abut opposed end surfaces of the cover portions of the conduits when said connector structure is in said installed position, and thereby to space the cover portions of the conduits apart from each other across a gap above said open side of said connector structure.

25. An apparatus as defined in claim 24 further comprising a lid receivable in an installed position in which said lid covers said gap.

26. An apparatus as defined in claim 25 wherein said connector structure and said lid are configured to interlock with each other in said installed positions.

27. An apparatus as defined in claim 25 wherein said lid is configured to overlap the cover portions of the conduits on opposite sides of said gap when said lid is in said installed position.

28. An apparatus as defined in claim 27 further comprising a gasket structure mounted on an underside of said lid as to overlie the cover portions of the conduits when said lid is in said installed position.

29. An apparatus for use with a pair of open-ended conduits for containing electrical wiring, each of which has a channel portion with an open side and a cover portion for closing the open side of the channel portion, said apparatus comprising:

a channel-shaped connector structure having an open side, said connector structure being receivable in an installed position engaging the open ends of the conduits with the connector structure and the conduits in longitudinal overlapping relationship and with said open side of said connector structure aligned with the open sides of the conduits;

a lid receivable in an installed position in which said lid extends over said open side of said connector structure; and said lid having a length longitudinally of said connector structure that is less than the longitudinal length of said connector structure.

30. An apparatus as defined in claim 29 wherein said connector structure extends into the open ends of the conduits when in said installed position.

31. An apparatus as defined in claim 29 wherein said lid is configured to overlap the cover portions of the conduits when said lid is in said installed position.

32. An apparatus as defined in claim 31 further comprising a gasket structure mounted on an underside of said lid so as to overlie the cover portions of the conduits when said lid is in said installed position.

33. An apparatus as defined in claim 29 wherein said connector structure has opposite ends, said connector structure having opposite sidewalls that terminate in inwardly curved corner portions between which said open side is defined, said connector structure and said lid being configured to interlock with each other adjacent said curved corner portions at locations spaced inwardly from said opposite ends in said installed position.

34. An apparatus as defined in claim 33 wherein said connector structure and said lid together include opposed ratchet teeth configured to snap into interlocked engagement with each other upon movement of said lid into said installed position.

35. An apparatus for use with a pair of open-ended conduits for containing electrical wiring, each of which has a channel portion with an open side and a cover portion for closing the open side of the channel portion, said apparatus comprising:

a channel-shaped connector structure having an open side, said connector structure being receivable in an installed position engaging the open ends of the conduits with said open side of said connector structure aligned with the open sides of the conduits;

a lid receivable in an installed position in which said lid extends over said open side of said connector structure;

said connector structure being configured to space the cover portions of the conduits apart from each other across a gap that extends across said open side of said connector structure when said connector structure is in said installed position; and said lid being configured to cover said gap when said lid is in said installed position.

36. An apparatus as defined in claim 35 wherein said lid is configured to overlap the cover portions of the conduits on opposite sides of said gap when said lid is in said installed position.

37. An apparatus as defined in claim 36 further comprising a gasket structure mounted on an underside of said lid so as to overlie the cover portions of the conduits when said lid is in said installed position.

38. A joint comprising: a pair of channel members having end portions to be joined and open sides, a channel-shaped connector member having an open side, said connector member being positioned between said channel member end portions in longitudinal overlapping relationship therewith and with the open side of the connector member aligned with the open sides of the channel members, fastener devices attached to said connector member that engage said channel members and provide sliding movement of said channel members relative to said fastener devices when said connector member and said channel member end portions are moved longitudinally toward one another into overlapping assembled relationship, and said fastening devices automatically gripping said channel member end portions to restrain the connector member and the channel member end portions against longitudinal movement away from one another after the connector member and the channel member end portions are in assembled overlapping relationship.

39. The joint of claim 38 wherein said connector member has connector member opposite ends and said fastener devices comprise generally U-shaped metal clips received over said connector member end portions.

40. The joint of claim 39 wherein said channel members have inner surfaces and said clips have tabs that engage said channel member inner surfaces, said clips and tabs being configured to provide sliding movement of said channel member inner surfaces relative to said tabs during longitudinal movement of said connector member and said channel member end portions toward one another into overlapping assembled relationship and to automatically restrain said connector member and said channel member end portions against longitudinal movement away from one another.

41. The joint of claim 39 wherein said channel member end portions have end surfaces, said connector member having connector member opposite ends and a peripheral abutment located intermediate said channel member opposite ends, said abutment having abutment surfaces in engagement with said channel member end surfaces.

42. The joint of claim 41 including sealing gaskets between said abutment surfaces and said channel member end surfaces.

43. The joint of claim 38 wherein said channel member and said connector member have sidewalls that terminate at said open sides thereof with inwardly curved corners that extend longitudinally of said channel members and said connector member.

44. The joint of claim 43 wherein said channel members and said connector member have bottom walls extending between said sidewalls thereof, said connector member having opposite connector member ends, a peripheral abutment extending along said connector member bottom wall, said connector member sidewalls and said connector member inwardly curved corners, and said channel member end portions having channel member end surfaces engaging said abutment.

45. The joint of claim 44 including sealing gaskets interposed between said abutment and said channel member end surfaces.

46. A connector comprising: a channel-shaped connector member of plastic material having a bottom wall, opposite sidewalls, opposite ends and an outer surface, and a peripheral abutment projecting outwardly from said outer surface along said bottom wall and said opposite sidewalls intermediate said opposite ends.

47. The connector member of claim 46 wherein said abutment has opposite abutment surfaces facing in opposite directions longitudinally of said connector member, and sealing gaskets on said abutment surfaces.

48. The connector member of claim 46 wherein said sidewalls terminate in inwardly curved corner portions that extend longitudinally of said connector member between said opposite ends thereof.

49. The connector member of claim 48 wherein said abutment extends continuously from said sidewalls along said inwardly curved corner portions.

50. The connector member of claim 46 including a plurality of metal clips attached to said connector member adjacent said opposite ends thereof for restraining longitudinal separation of channel members that are attached to said connector member.

51. The connector member of claim 50 wherein said metal clips are generally U-shaped and are received over said sidewalls and said bottom wall at said opposite ends.

52. The connector member of claim 46 wherein said bottom wall and said sidewalls include spaced-apart parallel inner and outer bottom walls and inner and outer sidewalls having channel-shaped compartments therebetween that open outwardly at said opposite ends of said connector member for receiving end portions of channel members, and said abutment extending between said inner and outer sidewalls and said inner and outer bottom walls.

53. An apparatus comprising:
a conduit for containing electrical wiring, said conduit having a channel portion with an open side and a separate cover portion for closing said open side of said channel portion;
a tether configured to extend from said channel portion of said conduit to said cover portion to retain said cover portion with said channel portion;
said tether having opposite end portions attached to the channel portion and cover portion; and
at least one of said end portions being slidable longitudinally of the channel portion relative to at least one of the channel portion and cover portion.

54. The apparatus of claim 53 wherein at least one of said channel portion and cover portion has transversely spaced longitudinal ribs and said tether has an end portion secured between said ribs for sliding movement thereof longitudinally of the channel portion.

55. An apparatus comprising:
a conduit for containing electrical wiring, said conduit having a channel portion with an open side and a separate cover portion for closing said open side of said channel portion;
a tether configured to extend from said channel portion of said conduit to said cover portion to retain said cover portion with said channel portion;
said channel portion having an interior and said cover portion having an underside;
said tether having opposite end portions attached to said channel portion interior and to said cover portion underside; and
at least one of said end portions being slidable in a direction longitudinally of the channel portion relative to the channel portion or cover portion to which it is attached.

* * * * *